(12) United States Patent
Morrill et al.

(10) Patent No.: US 10,412,090 B2
(45) Date of Patent: Sep. 10, 2019

(54) RESTRICTED WI-FI ACCESS BETWEEN PUBLIC AND PRIVATE SSIDS

(71) Applicant: CenturyLink Intellectual Property LLC, Denver, CO (US)

(72) Inventors: Robert J. Morrill, Overland Park, KS (US); John Bartell, Monroe, LA (US); Daniel M. Keller, Plymouth, MN (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 218 days.

(21) Appl. No.: 15/604,287

(22) Filed: May 24, 2017

(65) Prior Publication Data

US 2017/0346826 A1 Nov. 30, 2017

Related U.S. Application Data

(60) Provisional application No. 62/343,599, filed on May 31, 2016.

(51) Int. Cl.
| | |
|---|---|
| *H04L 29/06* | (2006.01) |
| *G06F 21/62* | (2013.01) |
| *H04W 12/08* | (2009.01) |
| *H04W 12/06* | (2009.01) |
| *H04W 84/12* | (2009.01) |
| *H04L 29/08* | (2006.01) |
| *H04W 12/00* | (2009.01) |

(52) U.S. Cl.
CPC ............ *H04L 63/10* (2013.01); *G06F 21/62* (2013.01); *H04W 12/08* (2013.01); *H04L 63/02* (2013.01); *H04L 67/02* (2013.01); *H04W 12/00512* (2019.01); *H04W 12/00516* (2019.01); *H04W 12/06* (2013.01); *H04W 84/12* (2013.01)

(58) Field of Classification Search
None
See application file for complete search history.

(56) References Cited

U.S. PATENT DOCUMENTS

| 8,824,487 B1* | 9/2014 | Ray | H04L 65/102 370/401 |
|---|---|---|---|
| 2011/0219229 A1* | 9/2011 | Cholas | G06F 21/00 713/168 |
| 2013/0217361 A1* | 8/2013 | Mohammed | H04W 12/06 455/411 |
| 2015/0195362 A1* | 7/2015 | Ong | H04L 67/141 709/225 |
| 2015/0327052 A1* | 11/2015 | Ghai | H04W 48/02 370/328 |

* cited by examiner

*Primary Examiner* — Malcolm Cribbs

(57) ABSTRACT

Novel tools and techniques are provided for implementing network access configurations, and, more particularly, for implementing restricted Wi-Fi access configuration between public and private service set identifiers ("SSIDs"). In some embodiments, a user might request public network access using a user device. A network device, which is in communication with the user device might receive the request for public network access from the user device. The network device might determine whether the user device is associated with a first identifier that is associated with a user having network private access to the network through the network device. If not, the network device might provide the user device with network public access to the network(s), via a network public access path. If so, the network device might prevent the user device from having network public access to the network(s).

22 Claims, 7 Drawing Sheets

RESTRICTED WI-FI ACCESS BETWEEN PUBLIC AND PRIVATE SSIDS

CROSS-REFERENCES TO RELATED APPLICATIONS

This application claims priority to U.S. Patent Application Ser. No. 62/343,599 (the "'599 Application"), filed May 31, 2016 by Robert J. Morrill et al., entitled, "Restricted Wi-Fi Access Between Public and Private SSIDs," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network access configurations, and, more particularly, to methods, systems, and apparatuses for implementing restricted Wi-Fi access configuration between public and private service set identifiers ("SSIDs").

BACKGROUND

Currently, the industry is moving towards a multi-service set identifier ("SSID") Wi-Fi solution in which a broadband subscriber's modem or gateway device, which has a first SSID that allows private network access, is augmented with a second SSID that allows controlled or public network access. Such a solution, however, may be susceptible to subscribers' attempts to boost their total subscribed bandwidth usage (via the private network access), by trying to additionally access the network via the public network access.

Hence, there is a need for more robust and scalable solutions for implementing network access configurations, and, more particularly, to methods, systems, and apparatuses for implementing restricted Wi-Fi access configuration between public and private SSIDs.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1A:
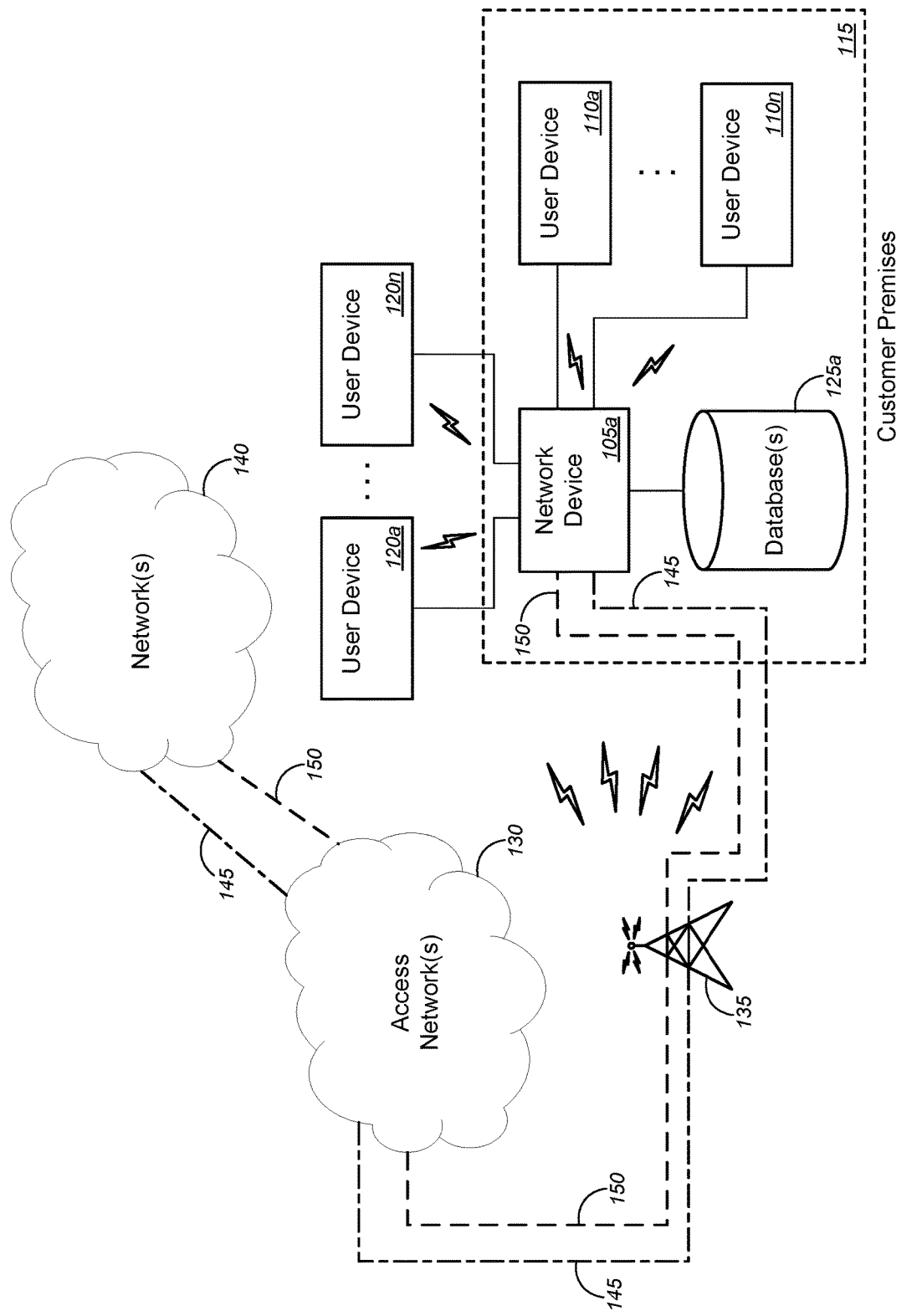
FIGS. 1A and 1B are schematic diagrams illustrating various systems for implementing restricted Wi-Fi access configuration between public and private SSIDs, in accordance with various embodiments.

Various embodiments provide tools and techniques for implementing network access configurations, and, more particularly, to methods, systems, and apparatuses for implementing restricted Wi-Fi access configuration between public and private service set identifiers ("SSIDs").

In various embodiments, a user might request public network access using a user device. A network device, which is in communication with the user device might receive the request for public network access from the user device. The network device might determine whether the user device is associated with a first identifier that is associated with a user having network private access to the network through the network device. If not, the network device might provide the user device with network public access to the network(s), via a network public access path. If so, the network device might prevent the user device from having network public access to the network(s).

In this manner, a user is prevented from supplementing his or her subscribed private access bandwidth with additional bandwidth from the community Wi-Fi or other public (or controlled) public access.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network utilization technology, network access technology, network limited portal technology, and/or the like. In other aspects, certain embodiments, can improve the functioning of user equipment or systems themselves (e.g., network devices, network nodes, modems, network interface devices, gateway devices, network switches, network routers, etc.), for example, by, in response to receiving a request for network public access to a network through a network device from a user device, determining, with the network device, whether the user device is associated with a first identifier that is associated with a user having network private access to the network through the network device, and, based on a determination that the user device is associated with a first identifier that is associated with a user having network private access to the network through the network device, preventing, with the network device, the user device from having network public access to the network, and/or the like. In particular, to the extent any abstract concepts are present in the various embodiments, those concepts can be implemented as described herein by devices, software, systems, and methods that involve specific novel functionality (e.g., steps or operations), such as in response to receiving a request for network public access to a network through a network device from a user device, determining, with the network device, whether the user device is associated with a first identifier that is associated with a user having network private access to the network through the network device, and, based on a determination that the user device is associated with a first identifier that is associated with a user having network private access to the network through the network device, preventing, with the network device, the user device from having network public access to the network, and/or the like, to name a few examples, that extend beyond mere conventional computer processing operations. These functionalities can produce tangible results outside of the implementing computer system, including, merely by way of example, policing of (or controlling) network usage to the subscribed and paid-for amount, and/or the like, at least some of which may be observed or measured by customers and/or service providers.

In an aspect, a method might comprise receiving, with a network device and from a user device, a request for network public access to a network through the network device; and determining, with the network device, whether the user device is associated with a first identifier that is associated with a user having network private access to the network through the network device. The method might further comprise, based on a determination that the user device is associated with a first identifier that is associated with a user having network private access to the network through the network device, preventing, with the network device, the user device from having network public access to the network.

In some embodiments, the first identifier might comprise a media access control ("MAC") address. Alternatively, or additionally, the first identifier might comprise a service set identifier ("SSID"). In some instances, the network device might comprise at least one of a modem, a gateway device, a network switch, or a network router, and/or the like.

According to some embodiments, the user device has a second identifier, and determining whether the user device is associated with the first identifier that is associated with a user having network private access to the network through the network device might comprise: accessing, with the network device, a database containing a list of identifiers; and comparing, with the network device, the second identifier with the first identifier. In some cases, preventing the user device from having network public access to the network might comprise preventing, with the network device, the user device from having network public access to the network, based on a determination that the second identifier matches the first identifier. Alternatively, preventing the user device from having network public access to the network might comprise preventing, with the network device, the user device from having network public access to the network, based on a determination that a user associated with the second identifier matches a user associated with the first identifier.

Merely by way of example, in some instances, the method might further comprise, further in response to receiving the request and further based on the determination that the user device is associated with the first identifier, providing, with the network device and to a user interface of the user device, options for the user to purchase additional bandwidth.

In some embodiments, the method might further comprise receiving, with the network device and from a second user device, a request for network private access to the network through the network device, the request for network private access comprising authentication information for accessing the network using network private access; and authenticating, with the network device, the second user device by authenticating the authentication information provided in the request for network private access, wherein the second user device has a third identifier. The method might additionally comprise, in response to the second user device being authenticated, determining, with the network device, whether the third identifier has previously been associated with the user having network private access to the network through the network device; and based on a determination that the third identifier has not previously been associated with the user having network private access to the network through the network device, adding, with the network device, the third identifier to a list in a database indicating the third identifier as being associated with the user having network private access to the network through the network device.

In another aspect, a network device might comprise at least one processor and a non-transitory computer readable medium communicatively coupled to the at least one processor. The non-transitory computer readable medium might have stored thereon computer software comprising a set of instructions that, when executed by the at least one processor, causes the network device to: receive, from a user device, a request for network public access to a network through the network device; determine whether the user device is associated with a first identifier that is associated with a user having network private access to the network through the network device; and based on a determination that the user device is associated with a first identifier that is associated with a user having network private access to the network through the network device, prevent the user device from having network public access to the network.

In some embodiments, the first identifier might comprise a media access control ("MAC") address. Alternatively, or additionally, the first identifier might comprise a service set identifier ("SSID"). In some instances, the network device might comprise at least one of a modem, a gateway device, a network switch, or a network router, and/or the like.

According to some embodiments, the user device has a second identifier, and determining whether the user device is associated with the first identifier that is associated with a user having network private access to the network through the network device might comprise: accessing a database containing a list of identifiers; and comparing the second identifier with the first identifier. In some cases, preventing the user device from having network public access to the network might comprise preventing the user device from having network public access to the network, based on a determination that the second identifier matches the first identifier. Alternatively, preventing the user device from having network public access to the network might comprise preventing the user device from having network public access to the network, based on a determination that a user associated with the second identifier matches a user associated with the first identifier.

Merely by way of example, in some instances, the set of instructions, when executed by the at least one processor, further causes the network device to provide, to a user interface of the user device, options for the user to purchase additional bandwidth, further in response to receiving the request and further based on the determination that the user device is associated with the first identifier.

In some embodiments, the set of instructions, when executed by the at least one processor, further causes the network device to: receive, from a second user device, a request for network private access to the network through the network device, the request for network private access comprising authentication information for accessing the network using network private access; authenticate the second user device by authenticating the authentication information provided in the request for network private access, wherein the second user device has a third identifier; in response to the second user device being authenticated, determine whether the third identifier has previously been associated with the user having network private access to the network through the network device; and based on a determination that the third identifier has not previously been associated with the user having network private access to the network through the network device, add the third identifier to a list in a database indicating the third identifier as being associated with the user having network private access to the network through the network device.

In yet another aspect, a system might comprise a network device, which might comprise at least one processor and a non-transitory computer readable medium communicatively coupled to the at least one processor. The non-transitory computer readable medium might have stored thereon computer software comprising a set of instructions that, when executed by the at least one processor, causes the network device to: receive, from a user device, a request for network public access to a network through the network device; determine whether the user device is associated with a first identifier that is associated with a user having network private access to the network through the network device; and based on a determination that the user device is associated with a first identifier that is associated with a user having network private access to the network through the network device, prevent the user device from having network public access to the network.

In some embodiments, the first identifier might comprise a media access control ("MAC") address. Alternatively, or additionally, the first identifier might comprise a service set identifier ("SSID"). In some instances, the network device might comprise at least one of a modem, a gateway device, a network switch, or a network router, and/or the like.

According to some embodiments, the user device has a second identifier, and determining whether the user device is associated with the first identifier that is associated with a user having network private access to the network through the network device might comprise: accessing a database containing a list of identifiers; and comparing the second identifier with the first identifier. In some cases, preventing the user device from having network public access to the network comprises preventing the user device from having network public access to the network, based on a determination that the second identifier matches the first identifier. Alternatively, preventing the user device from having network public access to the network might comprise preventing the user device from having network public access to the network, based on a determination that a user associated with the second identifier matches a user associated with the first identifier.

Merely by way of example, in some instances, the set of instructions, when executed by the at least one processor, further causes the network device to provide, to a user interface of the user device, options for the user to purchase additional bandwidth, further in response to receiving the request and further based on the determination that the user device is associated with the first identifier.

In some embodiments, the set of instructions, when executed by the at least one processor, further causes the network device to: receive, from a second user device, a request for network private access to the network through the network device, the request for network private access comprising authentication information for accessing the network using network private access; authenticate the second user device by authenticating the authentication information provided in the request for network private access, wherein the second user device has a third identifier; in response to the second user device being authenticated, determine whether the third identifier has previously been associated with the user having network private access to the network through the network device; and based on a determination that the third identifier has not previously been associated with the user having network private access to the network through the network device, add the third identifier to a list in a database indicating the third identifier as being associated with the user having network private access to the network through the network device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing network access configurations, and, more particularly, to methods, systems, and apparatuses for implementing restricted Wi-Fi access configuration between public and private service set identifiers ("SSIDs"), as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1B:
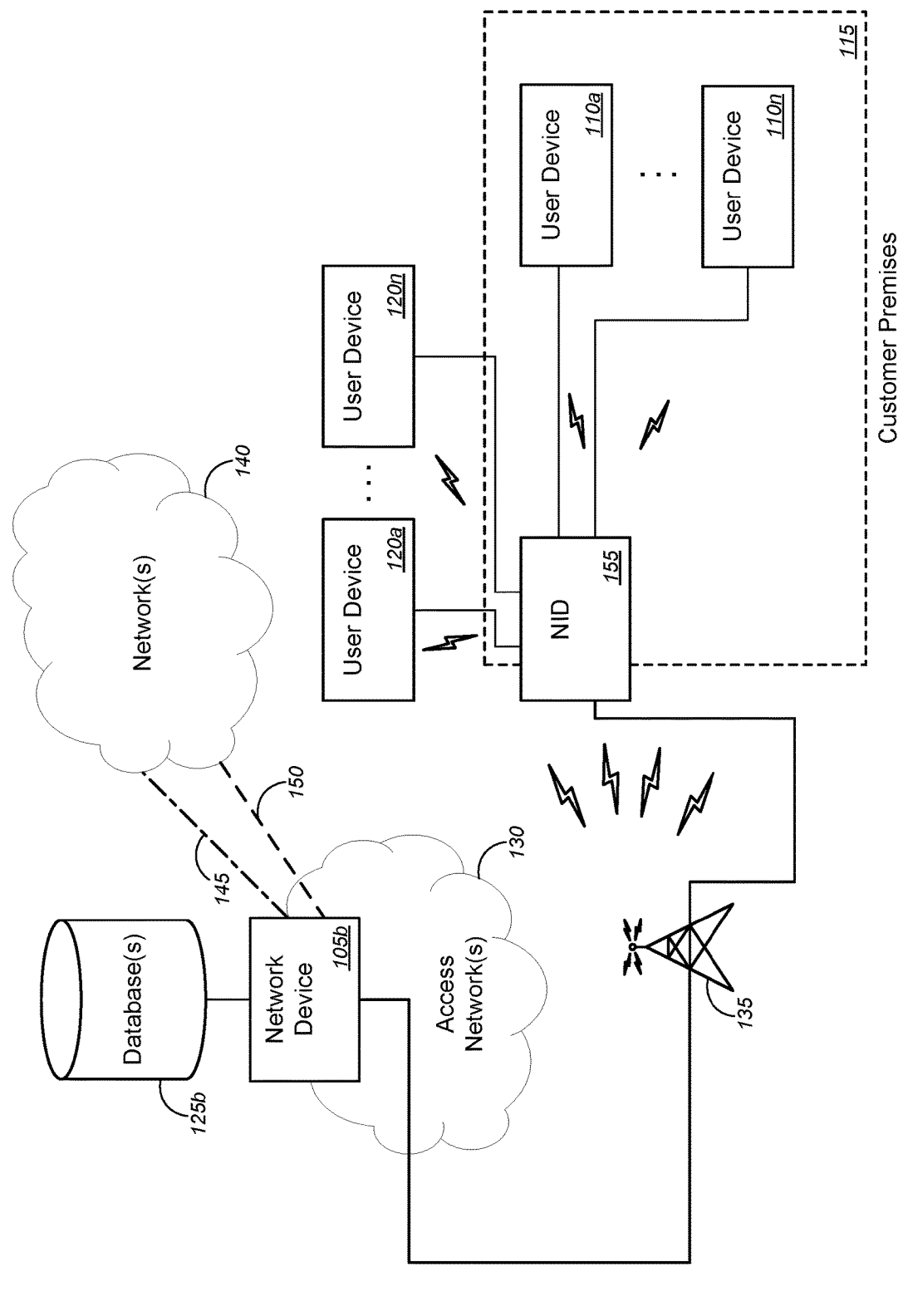

With reference to the figures, FIGS. 1A and 1B (collectively, "FIG. 1") are schematic diagrams illustrating various systems 100 and 100' for implementing restricted Wi-Fi access configuration between public and private SSIDs, in accordance with various embodiments.

In the non-limiting example of FIG. 1A, system 100 might comprise network device 105a, one or more user devices 110a-110n (collectively, "user devices 110"), one or more user devices 120a-120n (collectively, "user devices 120"), and database(s) 125a. The network device 105a, the user devices 110, and the database(s) 125a might be disposed within customer premises 115 (which might be associated with a user associated with at least one user device of user devices 110), while the user devices 120 might be disposed external to customer premises 115. The customer premises 115 might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like. According to some embodiments, the network device might include, without limitation, at least one of a modem, a gateway device, a network switch, or a network router, and/or the like.

System 100 might further comprise access network(s) 130, one or more telecommunications relay systems 135, and network(s) 140, and/or the like. The one or more telecommunications relay systems 135 might include, but are not limited to, one or more wireless network interfaces (e.g., wireless modems, wireless access points, and the like), one or more towers, one or more satellites, and/or the like). In FIG. 1, unless otherwise indicated, the solid lines denote wired communication, while the lightning bolt symbols denote wireless communication, and the dashed lines or dash-long dashed lines denote either wired or wireless communication.

In operation, a user might request public network access using a user device (e.g., one of the one or more user devices 110a-110n or one of the one or more user devices 120a-120n, or the like), e.g., by selecting a public access network (including, but not limited to, a community Wi-Fi network, or the like) from a list of available networks, or the like. The network device 105a, which is in communication with the user device—via wired communication (as denoted by solid lines therebetween) or wireless communication (as denoted by the lightning bolt symbols)—, might receive, from the user device, the request for public network access to the network(s) 140. The network device 105a might determine whether the user device is associated with a first identifier that is associated with a user having network private access to the network(s) 140 through the network device (here, the requesting user might either be the same person as the user having network private access, or a different user). If not, the network device 105a might provide the user device with network public access, via network public access path 150 to network(s) 140 (as depicted by the dash-lined path 150 in FIG. 1A, from the network device 105a to the network(s) 140 via the access network(s) 130 and the one or more telecommunications relay systems 135). If the user device is associated with a first identifier that is associated with a user having network private access to the network(s) 140, however, the network device 105a might prevent the user device from having network public access to the network(s) 140, e.g., by disconnecting, blocking, or preventing connection with the connection path between the user device and the network public access path 150. In some aspects, providing or preventing network access might be accomplished using a walled garden approach, a limited portal approach, and/or the like. The network device 105a, in some cases, might additionally provide, to a user interface of the user device, options for the user to purchase additional bandwidth, or to provide, to the user interface, at least a message or notification indicating that network public access is denied due to the user already having network private access, or the like.

In some embodiments, the user device might have a second identifier, and determining whether the user device is associated with the first identifier that is associated with a user having network private access to the network through the network device might comprise accessing, with the network device 105a, the database(s) 125a containing a list of identifiers; and comparing, with the network device, the second identifier with the first identifier. Merely by way of example, in some cases, alternative or additional to comparing the second identifier with the first identifier, the network device might compare the user(s) associated with the second identifier with the user(s) associated with the first identifier. In some instances, each of the first identifier or the second identifier might include without limitation, at least one of a media access control ("MAC") address, a service set identifier ("SSID"), and/or the like, and the list of identifiers might include, but is not limited to, a table of public MAC identifiers, a table of private or non-public MAC identifiers, a combined table of public and non-public MAC identifiers, a table of public SSIDs, a table of private or non-public SSIDs, a combined table of public and non-public SSIDs, and/or the like. The various tables in the database(s) 125a, which in some cases might be disposed within the network device 105a, might be retained despite rebooting of the network device 105a.

According to some embodiments, a user might request private network access using user device. The network device 105a, which is in communication with the user device—via wired communication or wireless communication—, might receive, from the user device, the request for private network access to the network(s) 140. The network device 105a might determine whether the user device is associated with a first identifier that is associated with a user having network private access to the network(s) 140 through the network device. If so, the network device 105a might provide the user device with network private access, via network public access path 145, to network(s) 140. If not, in addition to providing the user device with network private access via network public access path 145, the network device 105a might add the identifier of the user device to the list of identifiers stored in the database(s) 125a. In this manner, the network device 105a (and/or the system 100) might dynamically learn private MAC identifiers, SSID, and/or other identifiers of user devices that have successfully gained network private access to the network(s) 140. In a similar manner, the network device 105a (and/or the system 100) might similarly track user devices that have failed (and the frequency or number of failed attempts) to gain network private access to the network(s) 140.

Turning to FIG. 1B, system 100' might comprise network device 105b, one or more user devices 110a-110n (collectively, "user devices 110"), one or more user devices 120a-120n (collectively, "user devices 120"), database(s) 125b, and network interface device ("NID") 155. The user devices 110, and the NID 155 might be disposed at or within customer premises 115 (which might be associated with a user associated with at least one user device of user devices 110), while the user devices 120 might be disposed external to customer premises 115. As above, the customer premises 115 might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like. According to some embodiments, the network device might include, without limitation, at least one of a modem, a gateway device, a network switch, or a network router, and/or the like.

System 100' might further comprise access network(s) 130, one or more telecommunications relay systems 135, and network(s) 140, and/or the like. The one or more telecommunications relay systems 135 might include, but are not limited to, one or more wireless network interfaces (e.g., wireless modems, wireless access points, and the like), one or more towers, one or more satellites, and/or the like). In FIG. 1, unless otherwise indicated, the solid lines denote wired communication, while the lightning bolt symbols denote wireless communication, and the dashed lines or dash-long dashed lines denote either wired or wireless communication. The network device 105b and the database(s) 125b might be disposed within access network(s) 130.

In operation, a user might request public network access using a user device (e.g., one of the one or more user devices 110a-110n or one of the one or more user devices 120a-120n, or the like), e.g., by selecting a public access network (including, but not limited to, a community Wi-Fi network, or the like) from a list of available networks, or the like. The network device 105b, which is in communication with the user device—via wired communication (as denoted by solid lines therebetween) and/or wireless communication (as denoted by the lightning bolt symbols) and via NID 155, the access network(s) 130, and the one or more telecommunications relay systems 135—, might receive, from the user device, the request for public network access to the network(s) 140. The network device 105b might determine whether the user device is associated with a first identifier that is associated with a user having network private access to the network(s) 140 through the network device (here, the requesting user might either be the same person as the user having network private access, or a different user). If not, the network device 105b might provide the user device with network public access, via network public access path 150 to network(s) 140 (as depicted by the dash-lined path 150 in FIG. 1A, from the network device 105b to the network(s) 140). If the user device is associated with a first identifier that is associated with a user having network private access to the network(s) 140, however, the network device 105b might prevent the user device from having network public access to the network(s) 140, e.g., by disconnecting, blocking, or preventing connection with the connection path between the user device and the network public access path 150. In some aspects, providing or preventing network access might be accomplished using a walled garden approach, a limited portal approach, and/or the like. The network device 105b, in some cases, might additionally provide, to a user interface of the user device, options for the user to purchase additional bandwidth, or to provide, to the user interface, at least a message or notification indicating that network public access is denied due to the user already having network private access, or the like.

In some embodiments, the user device might have a second identifier, and determining whether the user device is associated with the first identifier that is associated with a user having network private access to the network through the network device might comprise accessing, with the network device 105b, the database(s) 125b containing a list of identifiers; and comparing, with the network device, the second identifier with the first identifier. Merely by way of example, in some cases, alternative or additional to comparing the second identifier with the first identifier, the network device might compare the user(s) associated with the second identifier with the user(s) associated with the first identifier. In some instances, each of the first identifier or the second identifier might include without limitation, at least one of a media access control ("MAC") address, a service set identifier ("SSID"), and/or the like, and the list of identifiers might include, but is not limited to, a table of public MAC identifiers, a table of private or non-public MAC identifiers, a combined table of public and non-public MAC identifiers, a table of public SSIDs, a table of private or non-public SSIDs, a combined table of public and non-public SSIDs, and/or the like. The various tables in the database(s) 125b, which in some cases might be disposed within the network device 105b, might be retained despite rebooting of the network device 105b.

According to some embodiments, a user might request private network access using user device. The network device 105b, which is in communication with the user device—via wired communication and/or wireless communication and via NID 155, the access network(s) 130, and the one or more telecommunications relay systems 135—, might receive, from the user device, the request for private network access to the network(s) 140. The network device 105b might determine whether the user device is associated with a first identifier that is associated with a user having network private access to the network(s) 140 through the network device. If so, the network device 105b might provide the user device with network private access, via network public access path 145, to network(s) 140. If not, in addition to providing the user device with network private access via network public access path 145, the network device 105b might add the identifier of the user device to the list of identifiers stored in the database(s) 125b. In this manner, the network device 105b (and/or the system 100) might dynamically learn private MAC identifiers, SSID, and/or other identifiers of user devices that have successfully gained network private access to the network(s) 140. In a similar manner, the network device 105b (and/or the system 100) might similarly track user devices that have failed (and the frequency or number of failed attempts) to gain network private access to the network(s) 140.

Figure 2:
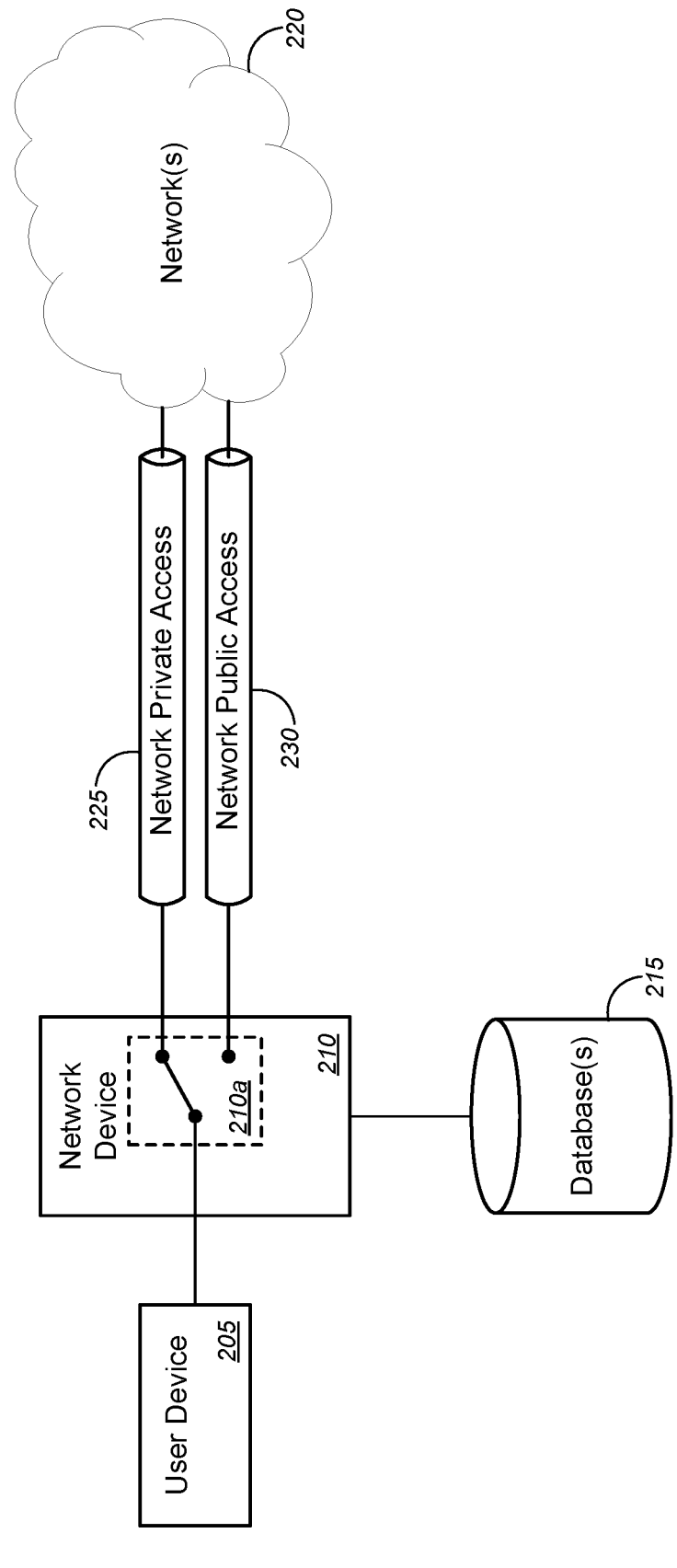
FIG. 2 is a simplified schematic diagram illustrating a system for implementing restricted Wi-Fi access configuration between public and private SSIDs, in accordance with various embodiments.

FIG. 2 is a simplified schematic diagram illustrating a system 200 for implementing restricted Wi-Fi access configuration between public and private SSIDs, in accordance with various embodiments.

In the non-limiting example of FIG. 2, system 200 might comprise a user device 205 (which might correspond to at least one of user devices 110a-110n and 120a-120n of FIGS. 1A and 1B, or the like), a network device 210 (which might correspond to at least one of network devices 105a and 105b of FIGS. 1A and 1B, or the like), a database(s) 215 (which might comprise to at least one of database(s) 125a and 125b of FIGS. 1A and 1B, or the like), and network(s) 220 (which might correspond to at least one of networks 130 and 140 of FIGS. 1A and 1B, or the like). System 200 might further comprise network private access path 225 and network public access path 230.

In operation, a user might request public network access using user device 205. The network device 210, which is in communication with the user device 205—via wired communication or wireless communication —, might receive, from the user device 205, the request for public network access to the network(s) 220. The network device 210 might determine whether the user device 205 is associated with a first identifier that is associated with a user having network private access to the network(s) 220 through the network device. If not, the network device 210 might provide the user device 205 with network public access, via network public access path 230 using network switch 210a, to network(s) 220. If so, the network device 525 might prevent the user device from having network public access to the network(s) 510, e.g., by disconnecting, blocking, or preventing connection with the connection path between the user device 205 and the network public access path 230, using network switch 210a. In some aspects, providing or preventing network access might be accomplished using a walled garden approach, a limited portal approach, and/or the like. The network device 210, in some cases, might additionally provide, to a user interface of the user device, options for the user to purchase additional bandwidth, or to provide, to the user interface, at least a message or notification indicating that network public access is denied due to the user already having network private access, or the like.

In some embodiments, the user device 205 might have a second identifier, and determining whether the user device is associated with the first identifier that is associated with a user having network private access to the network through the network device might comprise accessing, with the network device 210, the database(s) 215 containing a list of identifiers; and comparing, with the network device, the second identifier with the first identifier. Merely by way of example, in some cases, alternative or additional to comparing the second identifier with the first identifier, the network device might compare the user(s) associated with the second identifier with the user(s) associated with the first identifier. In some instances, each of the first identifier or the second identifier might include without limitation, at least one of a media access control ("MAC") address, a service set identifier ("SSID"), and/or the like, and the list of identifiers might include, but is not limited to, a table of public MAC identifiers, a table of private or non-public MAC identifiers, a combined table of public and non-public MAC identifiers, a table of public SSIDs, a table of private or non-public SSIDs, a combined table of public and non-public SSIDs, and/or the like. The various tables in the database(s) 215, which in some cases might be disposed within the network device 210, might be retained despite rebooting of the network device 210.

According to some embodiments, a user might request private network access using user device 205. The network device 210, which is in communication with the user device 205—via wired communication or wireless communication—, might receive, from the user device 205, the request for private network access to the network(s) 220. The network device 210 might determine whether the user device 205 is associated with a first identifier that is associated with a user having network private access to the network(s) 220 through the network device. If so, the network device 210 might provide the user device 205 with network private access, via network public access path 225 using network switch 210a, to network(s) 220. If not, in addition to providing the user device 205 with network private access via network public access path 225, the network device 210 might add the identifier of the user device 205 to the list of identifiers stored in the database(s) 215. In this manner, the network device 210 (and/or the system 200) might dynamically learn private MAC identifiers, SSID, and/or other identifiers of user devices that have successfully gained network private access to the network(s) 220. In a similar manner, the network device 210 (and/or the system 200) might similarly track user devices that have failed (and the frequency or number of failed attempts) to gain network private access to the network(s) 220.

The user device 205, the network device 210, the database(s) 215, the network(s) 220, the network private access path 225, and the network public access path 230 of system 200 might otherwise be similar, if not identical to, the user devices 110 or 120, the network devices 105a or 105b, the database(s) 125a or 125b, the network(s) 140, the network private access path 145, and the network public access path 150 of systems 100 of FIG. 1A and 100' of FIG. 1B, as described above.

Figure 3A:
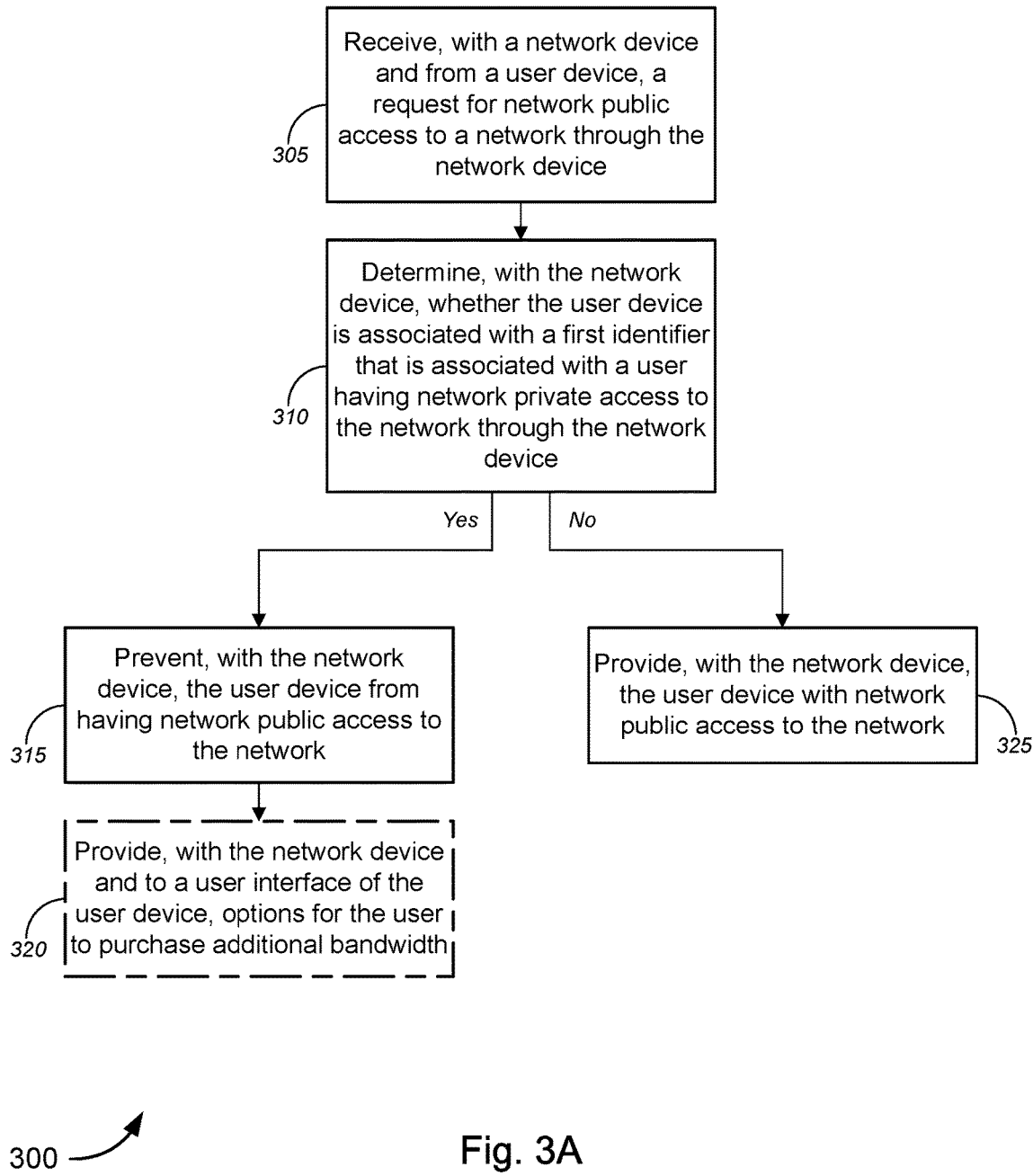
FIGS. 3A and 3B are flow diagrams illustrating a method for implementing restricted Wi-Fi access configuration between public and private SSIDs, in accordance with various embodiments.
Figure 3B:
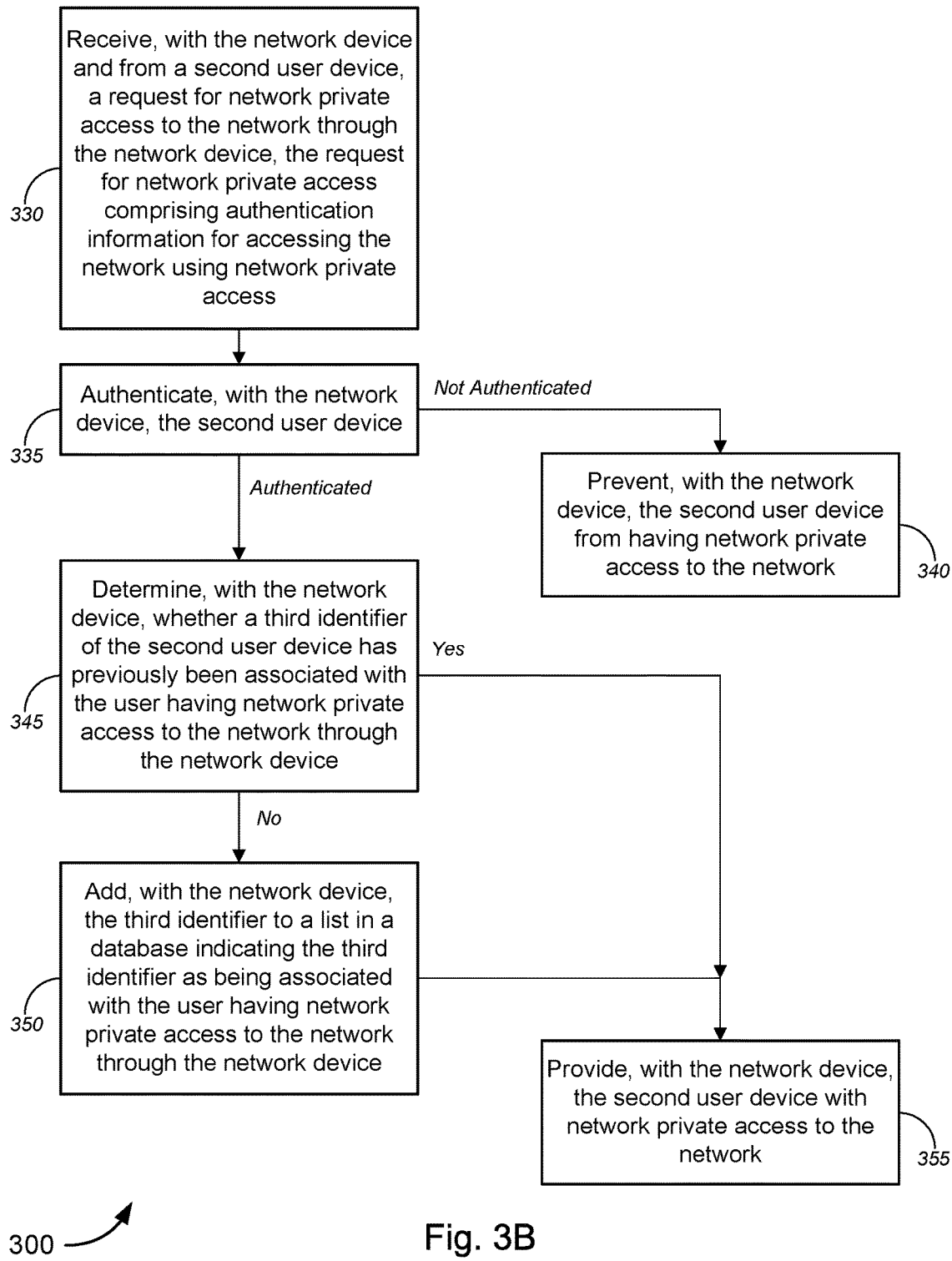

FIGS. 3A and 3B are flow diagrams illustrating a method 300 for implementing restricted Wi-Fi access configuration between public and private SSIDs, in accordance with various embodiments.

While the techniques and procedures are depicted and/or described in a certain order for purposes of illustration, it should be appreciated that certain procedures may be reordered and/or omitted within the scope of various embodiments. Moreover, while the method 300 illustrated by FIG. 3 can be implemented by or with (and, in some cases, are described below with respect to) the systems 100, 100', and 200 of FIGS. 1A, 1B, and 2, respectively (or components thereof), such methods may also be implemented using any suitable hardware (or software) implementation. Similarly, while each of the systems 100, 100', and 200 of FIGS. 1A, 1B, and 2, respectively (or components thereof), can operate according to the method 300 illustrated by FIG. 3 (e.g., by executing instructions embodied on a computer readable medium), the systems 100, 100', and 200 of FIGS. 1A, 1B, and 2 can each also operate according to other modes of operation and/or perform other suitable procedures.

In the non-limiting embodiment of FIG. 3A, method 300, at block 305, receiving, with a network device (which might correspond to at least one of network devices 105a, 105b, and 210 of FIGS. 1A, 1B, and 2, or the like) and from a user device (which might correspond to at least one of user devices 110a-110n, 120a-120n, and 205 of FIGS. 1A, 1B, and 2, or the like), a request for network public access to a network (which might correspond to at least one of networks 130, 140, and 220 of FIGS. 1 and 2, or the like) through the network device.

At block 310, method 300 might comprise determining, with the network device, whether the user device is associated with a first identifier that is associated with a user having network private access to the network through the network device. In some embodiments, the first identifier might comprise a media access control ("MAC") address. Alternatively, or additionally, the first identifier might comprise a service set identifier ("SSID"). According to some embodiments, the user device has a second identifier, and determining whether the user device is associated with the first identifier that is associated with a user having network private access to the network through the network device might comprise accessing, with the network device, a database (which might comprise to at least one of database(s) 125a, 125b, and 215 of FIGS. 1A, 1B, and 2, or the like) containing a list of identifiers; and comparing, with the network device, the second identifier with the first identifier. Merely by way of example, in some aspects, rather than comparing the second identifier with the first identifier, the network device might compare the user(s) associated with the second identifier with the user(s) associated with the first identifier.

Method 300 might further comprise, based on a determination (at block 310) that the user device is associated with a first identifier that is associated with a user having network private access to the network through the network device, preventing, with the network device, the user device from having network public access to the network (block 315), in some cases, based on a determination that the second identifier matches the first identifier, while, in other cases, based on a determination that the user(s) associated with the second identifier matches the user(s) associated with the first identifier. Method 300, at optional block 320, might further comprise providing, with the network device and to a user interface of the user device, options for the user to purchase additional bandwidth.

Alternatively, based on a determination (at block 310) that the user device is not associated with a first identifier that is associated with a user having network private access to the network through the network device, method 300 might further comprise providing, with the network device, the user device with network public access to the network (block 325).

With reference to FIG. 3B, method 300 might further comprise, at block 330, receiving, with the network device and from a second user device, a request for network private access to the network through the network device, the request for network private access comprising authentication information for accessing the network using network private access. At block 335, method 300 might comprise authenticating, with the network device, the second user device, in some instances, by authenticating the authentication information provided in the request for network private access. If the second user device is not authenticated, the process proceeds to block 340, at which method 300 comprises preventing, with the network device, the second user device from having network private access to the network. On the other hand, if the second user device, which has a third identifier, is authenticated, the process proceeds to block 345.

At block 345, method 300 might comprise determining, with the network device, whether the third identifier (of the second user device) has previously been associated with the user having network private access to the network through the network device. If not, the process proceeds to block 350, at which method 300 comprises adding, with the network device, the third identifier to a list in the database indicating the third identifier as being associated with the user having network private access to the network through the network device. Method 300, at block 355, might comprise providing, with the network device, the second user device with network private access to the network. If the third identifier has previously been associated with the user having network private access to the network through the network device, the process skips block 350 and proceeds directed to block 355.

Exemplary System and Hardware Implementation

Figure 4:
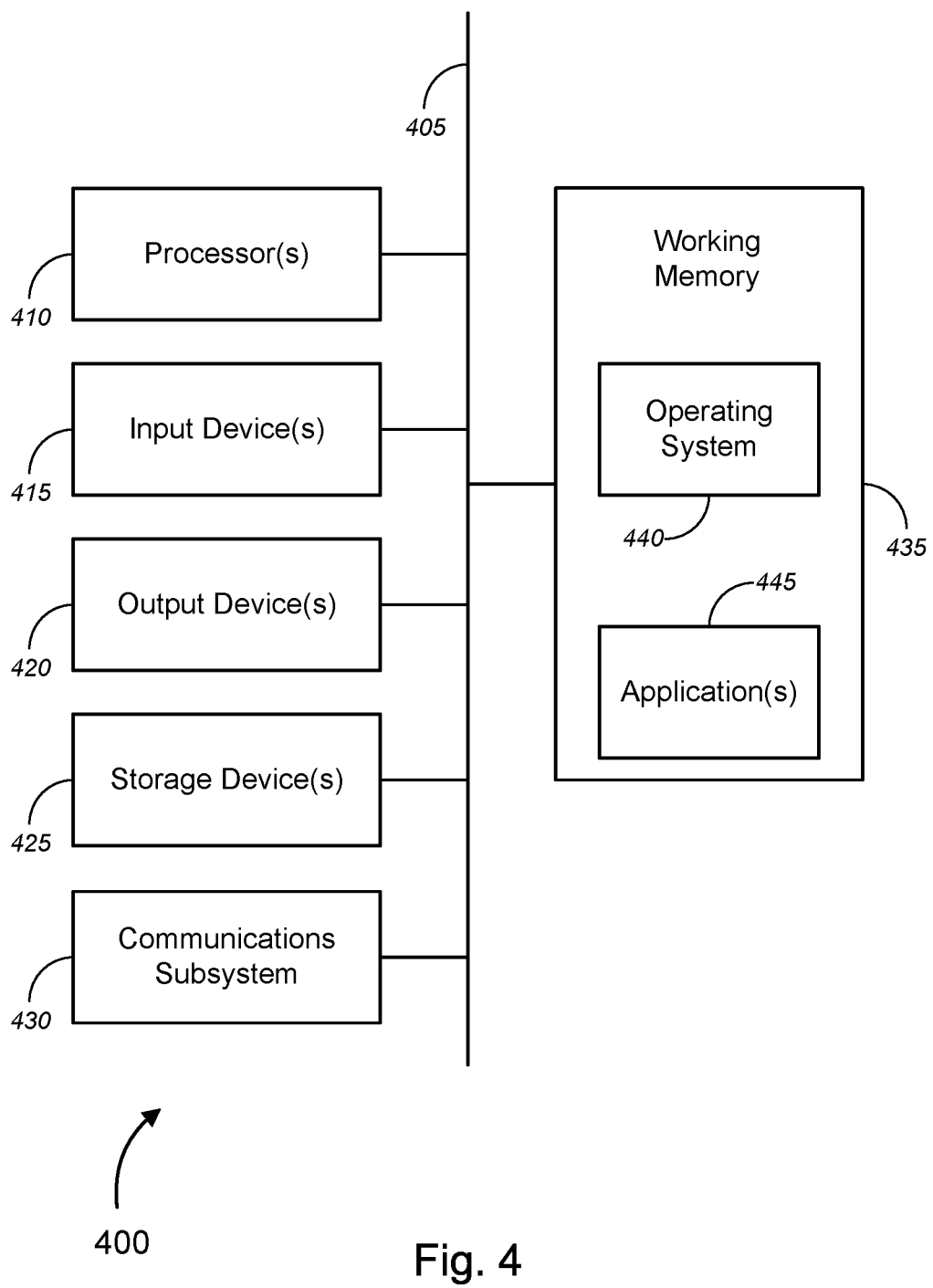
FIG. 4 is a block diagram illustrating an exemplary computer or system hardware architecture, in accordance with various embodiments.

FIG. 4 is a block diagram illustrating an exemplary computer or system hardware architecture, in accordance with various embodiments. FIG. 4 provides a schematic illustration of one embodiment of a computer system 400 of the service provider system hardware that can perform the methods provided by various other embodiments, as described herein, and/or can perform the functions of computer or hardware system (i.e., network devices 105a, 105b, and 210, user devices 110a-110n, 120a-120n, and 205, and network interface device ("NID") 155, etc.), as described above. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer or hardware system 400—which might represent an embodiment of the computer or hardware system (i.e., network devices 105a, 105b, and 210, user devices 110a-110n, 120a-120n, and 205, and NID 155, etc.), described above with respect to FIGS. 1-3—is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as microprocessors, digital signal processing chips, graphics acceleration processors, and/or the like); one or more input devices 415, which can include, without limitation, a mouse, a keyboard and/or the like; and one or more output devices 420, which can include, without limitation, a display device, a printer, and/or the like.

The computer or hardware system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 400 might also include a communications subsystem 430, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer or hardware systems, and/or with any other devices described herein. In many embodiments, the computer or hardware system 400 will further comprise a working memory 435, which can include a RAM or ROM device, as described above.

The computer or hardware system 400 also may comprise software elements, shown as being currently located within the working memory 435, including an operating system 440, device drivers, executable libraries, and/or other code, such as one or more application programs 445, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 400 and/or might take the form of source and/or installable code, which, upon compilation and/or installation on the computer or hardware system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 400) to perform methods in accordance with various embodiments of the invention. According to a set of embodiments, some or all of the procedures of such methods are performed by the computer or hardware system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 400, various computer readable media might be involved in providing instructions/code to processor(s) 410 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 425. Volatile media includes, without limitation, dynamic memory, such as the working memory 435. In some alternative embodiments, a computer readable medium may take the form of transmission media, which includes, without limitation, coaxial cables, copper wire and fiber optics, including the wires that comprise the bus 405, as well as the various components of the communication subsystem 430 (and/or the media by which the communications subsystem 430 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
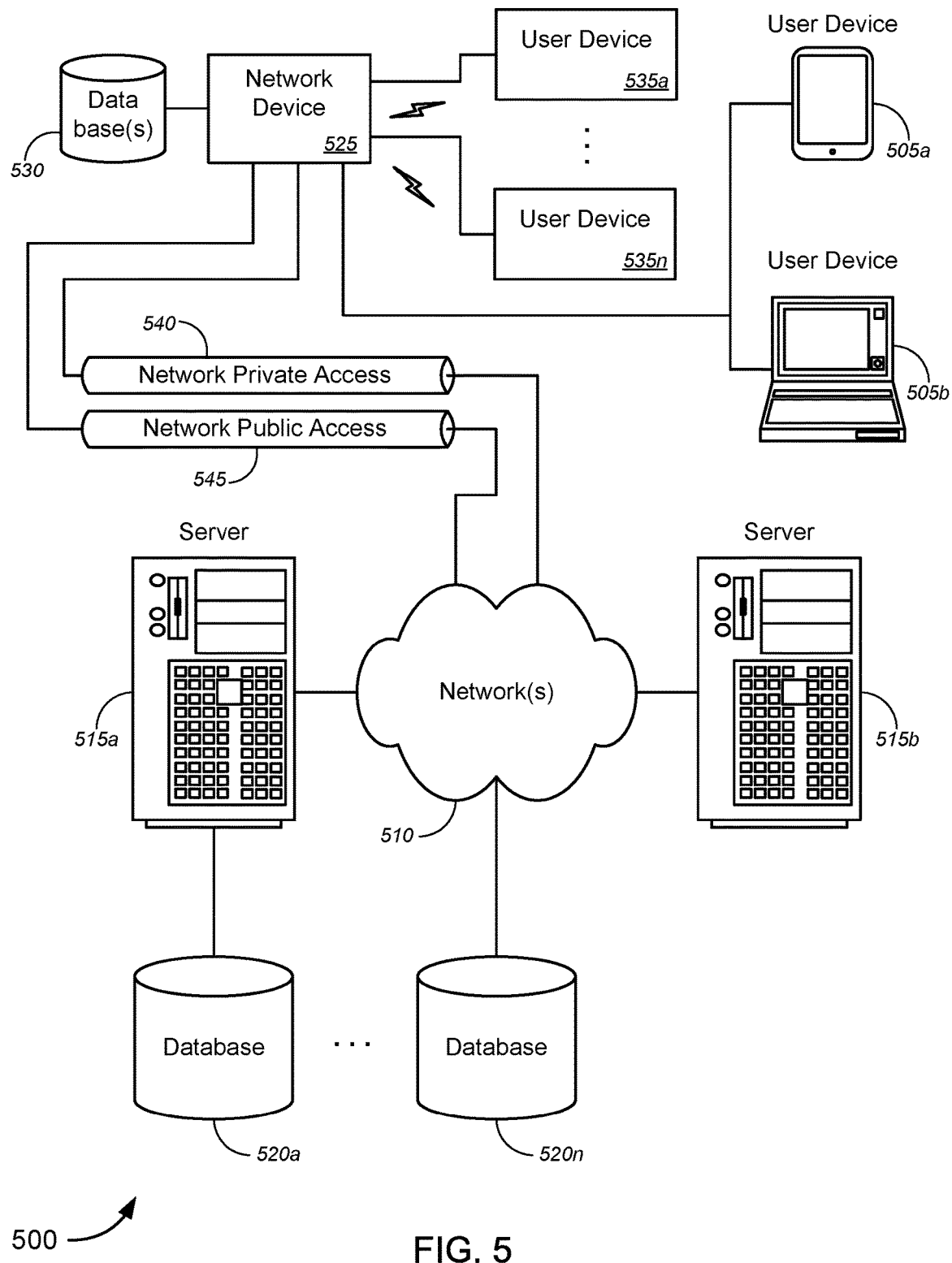
FIG. 5 is a block diagram illustrating a networked system of computers, computing systems, or system hardware architecture, which can be used in accordance with various embodiments.

As noted above, a set of embodiments comprises methods and systems for implementing network access configurations, and, more particularly, to methods, systems, and apparatuses for implementing restricted Wi-Fi access configuration between public and private service set identifiers ("SSIDs"). FIG. 5 illustrates a schematic diagram of a system 500 that can be used in accordance with one set of embodiments. The system 500 can include one or more user computers, user devices, or customer devices 505. A user computer, user device, or customer device 505 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 505 can also have any of a variety of applications, including one or more applications configured to perform methods provided by various embodiments (as described above, for example), as well as one or more office applications, database client and/or server applications, and/or web browser applications. Alternatively, a user computer, user device, or customer device 505 can be any other electronic device, such as a thin-client computer, Internet-enabled mobile telephone, and/or personal digital assistant, capable of communicating via a network (e.g., the network(s) 510 described below) and/or of displaying and navigating web pages or other types of electronic documents. Although the exemplary system 500 is shown with two user computers, user devices, or customer devices 505, any number of user computers, user devices, or customer devices can be supported.

Certain embodiments operate in a networked environment, which can include a network(s) 510. The network(s) 510 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 510 (similar to network(s) 130 and 140 of FIG. 1 or network(s) 220 of FIG. 2, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 might be a data server, a web server, a cloud computing device(s), or the like, as described above. The data server might include (or be in communication with) a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more application servers, which can be configured with one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 505 and/or another server 515. In some embodiments, an application server can perform one or more of the processes for implementing network access configurations, and, more particularly, to methods, systems, and apparatuses for implementing restricted Wi-Fi access configuration between public and private service set identifiers ("SSIDs"), as described in detail above. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer, user device, or customer device 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520a-520n (collectively, "databases 520"). The location of each of the databases 520 is discretionary: merely by way of example, a database 520a might reside on a storage medium local to (and/or resident in) a server 515a (and/or a user computer, user device, or customer device 505). Alternatively, a database 520n can be remote from any or all of the computers 505, 515, so long as it can be in communication (e.g., via the network(s) 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle database, that is adapted to store, update, and retrieve data in response to SQL-formatted commands. The database might be controlled and/or maintained by a database server, as described above, for example.

According to some embodiments, system 500 might further comprise a network device 525 (similar to network devices 105*a*, 105*b*, and 210 of FIGS. 1A, 1B, and 2, or the like), database(s) 530 (similar to database(s) 125*a*, 125*b*, and 215 of FIGS. 1A, 1B, and 2, or the like), one or more user devices 535*a*-535*n* (similar to user devices 110*a*-110*n*, 120*a*-120*n*, and 205 of FIGS. 1A, 1B, and 2, or the like), a network private access path 540 (similar to network private access path 145 and 225 of FIGS. 1 and 2, or the like), and a network public access path 545 (similar to network private access path 150 and 230 of FIGS. 1 and 2, or the like).

In operation, a user might request public network access using a user device (i.e., one of user device 505*a*, 505*b*, or 535*a*-535*n*). The network device 525, which is in communication with the user device—via wired communication (as shown by the line connection in FIG. 6) or wireless communication (as shown by the lightning bolt symbols in FIG. 6)—, might receive the request for public network access from the user device. The network device 525 might determine whether the user device is associated with a first identifier that is associated with a user having network private access to the network through the network device. If not, the network device 525 might provide the user device with network public access, via network public access path 545, to network(s) 510. If so, the network device 525 might prevent the user device from having network public access to the network(s) 510.

These and other functions of the system 500 (and its components) are described in greater detail above with respect to FIGS. 1-3.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a network device and from a user device, a request for network public access to a network through the network device;
   determining, with the network device, whether the user device is associated with a first identifier that is associated with a user having network private access to the network through the network device;
   based on a determination that the user device is associated with a first identifier that is associated with a user having network private access to the network through the network device, preventing, with the network device, the user device from having network public access to the network;
   receiving, with the network device and from a second user device, a request for network private access to the network through the network device, the request for network private access comprising authentication information for accessing the network using network private access;
   authenticating, with the network device, the second user device by authenticating the authentication information provided in the request for network private access, wherein the second user device has a third identifier;
   in response to the second user device being authenticated, determining, with the network device, whether the third identifier has previously been associated with the user having network private access to the network through the network device; and
   based on a determination that the third identifier has not previously been associated with the user having network private access to the network through the network device, adding, with the network device, the third identifier to a list in a database indicating the third identifier as being associated with the user having network private access to the network through the network device.

2. The method of claim 1, wherein the first identifier comprises a media access control ("MAC") address.

3. The method of claim 1, wherein the first identifier comprises a service set identifier ("SSID").

4. The method of claim 1, wherein the network device comprises at least one of a modem, a gateway device, a network switch, or a network router.

5. The method of claim 1, wherein the user device has a second identifier, wherein determining whether the user device is associated with the first identifier that is associated with a user having network private access to the network through the network device comprises:
   accessing, with the network device, a database containing a list of identifiers; and
   comparing, with the network device, the second identifier with the first identifier.

6. The method of claim 5, preventing the user device from having network public access to the network comprises preventing, with the network device, the user device from having network public access to the network, based on a determination that the second identifier matches the first identifier.

7. The method of claim 5, preventing the user device from having network public access to the network comprises preventing, with the network device, the user device from having network public access to the network, based on a determination that a user associated with the second identifier matches a user associated with the first identifier.

8. The method of claim 1, further comprising:
further in response to receiving the request and further based on the determination that the user device is associated with the first identifier, providing, with the network device and to a user interface of the user device, options for the user to purchase additional bandwidth.

9. A network device, comprising:
at least one processor; and
a non-transitory computer readable medium communicatively coupled to the at least one processor, the non-transitory computer readable medium having stored thereon computer software comprising a set of instructions that, when executed by the at least one processor, causes the network device to:
  receive, from a user device, a request for network public access to a network through the network device;
  determine whether the user device is associated with a first identifier that is associated with a user having network private access to the network through the network device;
  based on a determination that the user device is associated with a first identifier that is associated with a user having network private access to the network through the network device, prevent the user device from having network public access to the network;
  receive, from a second user device, a request for network private access to the network through the network device, the request for network private access comprising authentication information for accessing the network using network private access;
  authenticate the second user device by authenticating the authentication information provided in the request for network private access, wherein the second user device has a third identifier;
  in response to the second user device being authenticated, determine whether the third identifier has previously been associated with the user having network private access to the network through the network device; and
  based on a determination that the third identifier has not previously been associated with the user having network private access to the network through the network device, add the third identifier to a list in a database indicating the third identifier as being associated with the user having network private access to the network through the network device.

10. The network device of claim 9, wherein the first identifier comprises a media access control ("MAC") address.

11. The network device of claim 9, wherein the first identifier comprises a service set identifier ("SSID").

12. The network device of claim 9, wherein the network device comprises at least one of a modem, a gateway device, a network switch, or a network router.

13. The network device of claim 9, wherein the user device has a second identifier, wherein determining whether the user device is associated with the first identifier that is associated with a user having network private access to the network through the network device comprises:
  accessing a database containing a list of identifiers; and
  comparing the second identifier with the first identifier.

14. The network device of claim 13, wherein preventing the user device from having network public access to the network comprises preventing the user device from having network public access to the network, based on a determination that the second identifier matches the first identifier.

15. The network device of claim 9, wherein the set of instructions, when executed by the at least one processor, further causes the network device to:
  further in response to receiving the request and further based on the determination that the user device is associated with the first identifier, provide, to a user interface of the user device, options for the user to purchase additional bandwidth.

16. A system, comprising:
a network device, comprising:
  at least one processor; and
  a non-transitory computer readable medium communicatively coupled to the at least one processor, the non-transitory computer readable medium having stored thereon computer software comprising a set of instructions that, when executed by the at least one processor, causes the network device to:
    receive, from a user device, a request for network public access to a network through the network device;
    determine whether the user device is associated with a first identifier that is associated with a user having network private access to the network through the network device;
    based on a determination that the user device is associated with a first identifier that is associated with a user having network private access to the network through the network device, prevent the user device from having network public access to the network;
    receive, from a second user device, a request for network private access to the network through the network device, the request for network private access comprising authentication information for accessing the network using network private access;
    authenticate the second user device by authenticating the authentication information provided in the request for network private access, wherein the second user device has a third identifier;
    in response to the second user device being authenticated, determine whether the third identifier has previously been associated with the user having network private access to the network through the network device; and
    based on a determination that the third identifier has not previously been associated with the user having network private access to the network through the network device, add the third identifier to a list in a database indicating the third identifier as being associated with the user having network private access to the network through the network device.

17. The system of claim 16, wherein the first identifier comprises a media access control ("MAC") address.

18. The system of claim 16, wherein the first identifier comprises a service set identifier ("SSID").

19. The system of claim 16, wherein the network device comprises at least one of a modem, a gateway device, a network switch, or a network router.

20. The system of claim 16, wherein the user device has a second identifier, wherein determining whether the user device is associated with the first identifier that is associated with a user having network private access to the network through the network device comprises:

accessing a database containing a list of identifiers; and comparing the second identifier with the first identifier.

21. The system of claim 20, wherein preventing the user device from having network public access to the network comprises preventing the user device from having network public access to the network, based on a determination the second identifier matches the first identifier.

22. The system of claim 16, wherein the set of instructions, when executed by the at least one processor, further causes the network device to:

further in response to receiving the request and further based on the determination that the user device is associated with the first identifier, provide, to a user interface of the user device, options for the user to purchase additional bandwidth.

\* \* \* \* \*